J. H. FARREL.

POCKET LAMP.

No. 11,299. Reissued Jan. 10, 1893.

Witnesses:
Hermann Bormann
Richard L. Maxwell.

Inventor:
John H. Farrel
by J. Walter Douglass.
Att'y.

THE NORRIS PETERS CO., PHOTO-LITHO., WASHINGTON, D. C.

UNITED STATES PATENT OFFICE.

JOHN HARVEY FARREL, OF CAMDEN, NEW JERSEY, ASSIGNOR TO HENRY W. MAYBAUM, OF PHILADELPHIA, PENNSYLVANIA.

POCKET-LAMP.

SPECIFICATION forming part of Reissued Letters Patent No. 11,299, dated January 10, 1893.

Original No. 439,578, dated October 28, 1890. Application for reissue filed March 26, 1891. Serial No. 386,568.

*To all whom it may concern:*

Be it known that I, JOHN HARVEY FARREL, a citizen of the United States, residing at Camden, in the county of Camden and State of New Jersey, have invented certain new and useful Improvements in Pocket-Lamps, of which the following is a specification.

My invention relates to that class of lighting devices designated as pocket lamps, and such as are provided with feeding devices and means adapted to ignite or explode by friction a fulminating pellet or cap applied to suitable material in order to light an appliance concealed within a housing.

The principal objects of my invention are first, to provide a cheap, compact, reliable and convenient lamp adapted to be carried in the pocket with perfect safety; second, to provide the oil reservoir or chamber of a pocket lamp with a hinged cover or lid through which a wick passes and arranged so that when said cover or lid is closed the wick assumes a position in proximity to the point or place of ignition of the fulminating pellets, caps or ignitible material; and third, to provide a pocket lamp adapted to contain a fulminate carrier or strip or ribbon having fulminating pellets, caps or ignitible material suitably applied thereto and adapted to be ignited by frictional contact with an ignitor or scratcher to cause a flame to be produced at the exposed end of a light producing appliance employed in connection with the lamp, and the construction and arrangement being such that the expended fulminate carrier or strip, tape or ribbon having the fulminating pellets, caps or ignitible material applied thereto will be wound up, so as to be easily removed for the insertion of another fulminate carrier or strip, tape or ribbon having fulminating pellets or caps suitably applied thereto.

My invention consists of a pocket lamp adapted for the employment of a suitable fulminate carrier or strip, tape or ribbon having fulminating pellets, caps or ignitible material suitably applied thereto, and the parts thereof arranged and adapted for operation substantially in the manner hereinafter described and pointed out in the claims.

Figure 1:
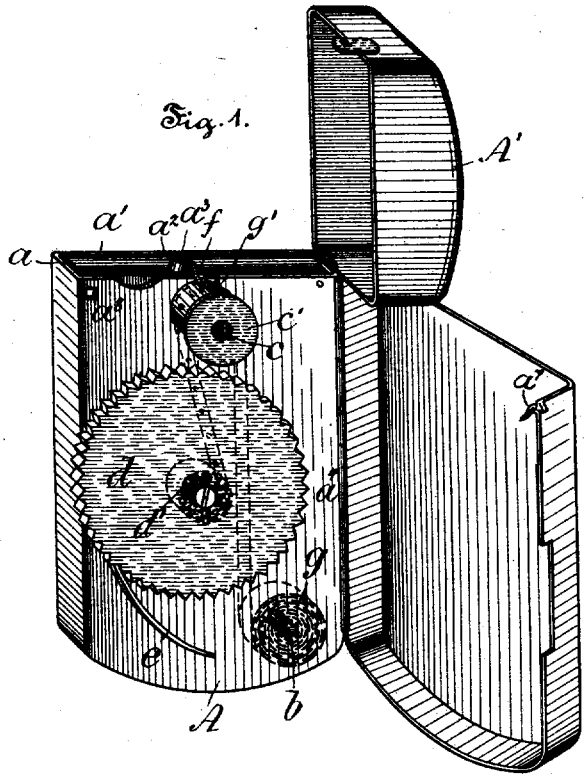
Figure 2:
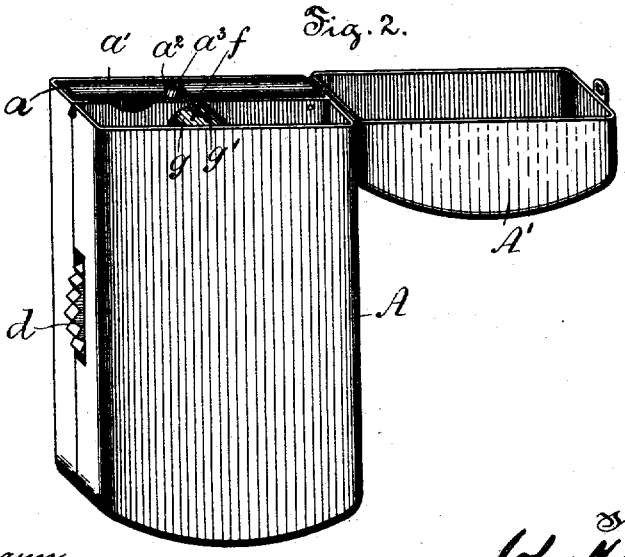

The characteristic features of the invention will be more fully understood from the following description taken in connection with the accompanying drawings forming part hereof; and in which Figure 1, is a perspective view of a pocket lamp embodying features of my invention and showing the housing thereof in an open position, with the fulminate carrier or strip, tape or ribbon provided with fulminating pellets or caps suitably applied thereto; and Fig. 2, is a similar view of a lamp, showing the two part housing in a closed position to permit of the actuation of the toothed disk for causing the fulminate carrier, strip, tape or ribbon provided with fulminating pellets or caps applied thereto to be fed and ignited by frictional contact with a scratcher disposed adjacent to the wick of the lamp to produce a flame thereat.

Referring to the drawings A, is a divided and recessed housing of the lamp provided with a chamber or reservoir $a$, adapted to receive oil and an absorbent material or substance, and said reservoir provided with a hinged cover $a'$. This cover is provided with a tube $a^2$, adapted to permit of the insertion therethrough of a wick $a^3$, held in the reservoir in contact with fibrous material immersed or saturated with suitable oil for maintaining the wick in a condition to readily permit of its being ignited or lighted at the exposed end of the tube $a^2$, in a manner to be hereinafter fully described.

$b$, is a retaining pin or lug secured to the wall $a^4$, of the oil reservoir $a$.

$c$, is a stud-pin secured to the wall of said oil-reservoir and provided with a loose sleeve $c'$.

$d$, is a toothed disk mounted on a pin $d'$, secured into the wall of the oil-reservoir $a$. This toothed disk $d$, is arranged so that a portion thereof will project beyond the recessed portion of the two part housing of the lamp.

$e$, is a curved spring adapted to normally engage with the toothed disk $d$, to prevent said disk from being turned in a reverse direction. The pin $d'$, of the disk $d$, is bifurcated for a purpose to be presently described.

$f$, is an ignitor or scratcher attached to the hinged cover $a'$, of the oil-reservoir $a$.

$g$, is a fulminate carrier or narrow strip or ribbon of muslin, linen or other suitable material provided with percussion caps or fulminating-pellets $g'$, disposed at suitable distances apart along the same. The fulminate carrier or narrow tape, strip or ribbon $g$, formed into a coil, is inserted onto the retaining pin or lug $b$, and then led around the loose sleeve $c'$, of the stud pin $c$, and the forward end thereof is coiled around and between the bifurcated pin $d'$, as shown in Fig. 1, and the divided housing is then closed, as shown in Fig. 2, with its cover A', thrown rearward and with the latch $a^7$, of one part of the housing caused to engage in the small recess or opening $a^8$, in the wall of the oil reservoir $a$. The disk $d$, is then actuated by the thumb or in any other preferred manner, and the fulminate carrier or narrow strip, tape or ribbon provided with fulminating pellets or caps is fed upward from the retaining pin $b$, around the loose sleeve $c'$, of the stud pin $c$, where the individual caps or pellets of the fulminate carrier or narrow strip, tape or ribbon $g$, are brought in regular succession by the operation into frictional contact with the ignitor or scratcher $f$, thereby causing the same to be exploded and the wick $a^3$, at the exposed end of the tube $a^2$, to be lighted. The fulminate carrier or narrow strip, tape or ribbon $g$, after its fulminating caps or pellets have been exploded simultaneously with the feeding of the same, is wound around the bifurcated pin $d'$, of the toothed disk $d$, until the entire carrier, strip, tape or ribbon has been rendered useless by the consumption of all of the fulminating caps or pellets thereof, when the said carrier, strip, tape or ribbon may be readily removed and another inserted by simply cause the lamp to assume a position, such as illustrated in Fig. 1.

In the manufacture of the fulminate carrier, strips, tapes or ribbons, it will of course be understood that the fulminating pellets or caps thereof, should be omitted for a short distance from the extremital portion of the same, in order that all possibility of accident or explosion in the insertion of the same around and between the bifurcated pin $d'$, of the toothed disk $d$, may be obviated. The stud pin $c$, instead of being provided with a loose sleeve $c'$, may be formed integral therewith; and moreover, this sleeve is preferably milled in the direction of its length to insure greater certainty of action in the feeding of the fulminating carrier, strip, tape or ribbon for presenting the individual fulminating pellets or caps thereof, to the ignitor or scratcher $f$.

Having thus described the nature and objects of the invention, what I claim as new and desire to secure by Letters Patent is:—

1. A pocket lamp provided with a divided housing and cover, an oil-retainer therein having a wick-holder and an ignitor or scratcher, a retainer adapted to hold a fulminate carrier, tape, strip or ribbon, a stud-pin supported adjacent to said ignitor or scratcher for said carrier, tape, strip or ribbon to travel over, and a toothed disk extending through the casing at one side and adapted to permit of said tape, strip or ribbon being caused to frictionally contact with said scratcher and the said disk provided with a pin adapted to permit of said tape, strip or ribbon being wound thereon, substantially as set forth.

2. A pocket lamp provided with a two part housing and a hinged cover, an oil-retainer adapted to support in position a wick and an ignitor or scratcher, a pin or lug adapted to hold a narrow tape, strip or ribbon provided with caps or pellets, a stud-pin provided with a milled sleeve, a toothed disk journaled in said housing and provided with means adapted to permit of said tape, strip or ribbon being wound thereon, and a spring normally engaging with a tooth of said disk, substantially as and for the purposes set forth.

3. A pocket lamp provided with a divided housing, an oil absorbent reservoir therein provided with a tube adapted to expose a wick, an ignitor or scratcher, a retaining pin, a tape, strip or ribbon provided with fulminating pellets or caps mounted thereon, a pin provided with a sleeve, a toothed disk partially exposed beyond said housing and provided with means to permit of said tape, strip or ribbon being wound thereon, and a spring to prevent a reverse movement of said disk, substantially as and for the purposes set forth.

4. A pocket lamp provided with an oil and absorbent material chamber or reservoir having a wick tube and ignitor or scratcher, a retainer located in the lower part of the lamp casing, a toothed disk extending through one side of said casing and provided with a pin or lug adapted to receive an ignitible strip, tape or ribbon, a stud-pin in the upper part of said casing having a loose sleeve mounted thereon, and said disk by the actuation thereof causing said strip, tape or ribbon to contact with said scratcher, substantially as set forth.

In witness whereof I have hereunto set my signature in the presence of two subscribing witnesses.

JOHN HARVEY FARREL.

Witnesses:
HERMANN BORMANN,
RICHARD C. MAXWELL.